Dec. 1, 1959　　　P. S. PERSSON ET AL　　　2,914,878
TRAWLS
Filed July 16, 1956

Inventors
P. S. Persson
O. W. Stranne
J. H. L. Oresten
By Clement Downing Seebold
Attys.

United States Patent Office 2,914,878
Patented Dec. 1, 1959

2,914,878

TRAWLS

Ponte Sterner Persson, Smogen, and Olaf Wedel Stranne and Johan Henry Lambert Oresten, Goteborg, Sweden Application July 16, 1956, Serial No. 598,045

2 Claims. (Cl. 43—9)

The present invention generally relates to trawls, and the invention has for one specific object, inter alia, to provide improved means whereby the mouth of a sack-like net can be varied conveniently by being expanded or constricted in a vertical direction.

For the object stated, according to the invention, a trawl is mainly characterised in that the mouth of its sack-like net is formed with at least six indentations or valleys disposed one at its upper edge, one at its bottom edge and two at each lateral edge, the said indentations being so arranged as to cause each lateral edge to form three tongues or crests adapted each to be connected with the trawler by a rope.

In accordance with a preferable embodiment of the invention, the tongues of each lateral edge of the mouth of the trawl net are connected with a common trawl board enabling the mouth of the trawl net to be expanded in a horizontal direction.

Another object of the invention is to provide a trawl board serving for expanding the mouth of the trawl net in a horizontal direction and which trawl board is adapted to be positively positioned when the trawl net is dragged through the water.

For the object thus stated, the trawl board is mainly characterised in that means (such as ropes, chains or the like) serving to connect the trawl board with the trawl net and with the trawler are connected to either of the two faces of the board in such a way as to cause the trawl board, when subjecting said means to pull, to adjust itself automatically into a suitable endwise tilted position relative to the direction of the pulling force.

Each one of said connecting means may be constituted by a plurality of ropes or chains which are connected at one end with the front or rear face, respectively, of the trawl board and at the trailing and leading ends of the latter, whereas at their opposite ends they are connected with each other by a common connecting device, for instance a so-called swivel which is adapted to be connected with the trawl net or with the trawler.

Since in operation the trawl board is required to occupy an essentially vertical position, the trawl board, according to a further feature of the invention, is provided at its bottom end with a weight-load whereas its remaining structure is made of a material the specific gravity of which is materially inferior to that of the weight-load.

The invention will now be described more closely, reference being had to the accompanying drawings illustrating by way of example two specific embodiments thereof, and in which.

Figure 1:
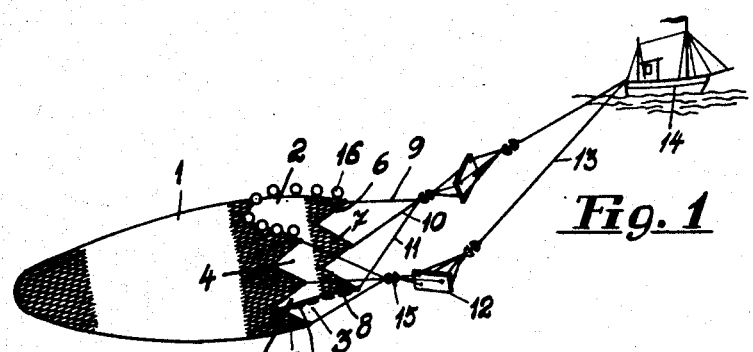
Fig. 1 is a perspective view of a trawl according to one embodiment of the invention, the trawl being dragged by one single vessel.

Referring now to Fig. 1 of the drawings, numeral 1 designates the sack-like trawl net proper which, in a manner known per se, may be of a cornet-like configuration. The mouth of the trawl net is formed with six indentations or valleys 2, 3, 4, 5 disposed one, 2, at its upper edge, one, 3, at its bottom edge, and two, 4, 5, at each lateral edge, respectively. All of these indentations are rearwardly extending and so interarranged that each one of the lateral edges forms three tongues or crests 6, 7, 8. Extending from the apex of each such tongue is a rope 9, 10 and 11, respectively, the three ropes coming from each lateral edge being connected with a trawl board 12 which latter, in its turn, is connected with a trawler 14 by a rope 13. The ropes 9, 10, 11 of each lateral edge of the trawl mouth are connected at their ends remote from the tongues 6, 7, 8 with a so-called swivel 15, and this swivel, in its turn, is connected with the trawl board 12 through the intermediary of a plurality of short ropes, in a manner to be described more closely hereinafter. As will appear from the figure, the indentations 2, 3, 4, 5 converge rearwardly, and the tongues converge forwardly. The upper indentation 2 and the bottom indentation 3 are substantially semi-circular in shape while the remaining indentations are substantially V-shaped. The upper edge portion of the mouth of the trawl net is provided with a plurality of floats 16 serving to lift this edge portion, and the bottom edge portion of the mouth of the trawl net is provided with a plurality of sinkers 17 serving to hold down this edge portion. The floats 16 and sinkers 17 thus serve the purpose of expanding the mouth of the trawl net vertically. The two above-mentioned trawl boards 12 serve to expand the mouth of the trawl net horizontally. To enable the mouth opening of the trawl net to be adjusted in the vertical direction, the ropes 9, 10, 11 are adjustable in length relative to each other, whereby it is possible, for example, by reducing the length of the rope 10, or by extending the lengths of the ropes 9, 11, to effect an expansion of the mouth opening of the trawl net, and conversely, by extending the length of the rope 10 and reducing the lengths of the ropes 9, 11, to obtain a constriction of the mouth opening of the trawl net.

Figure 2:
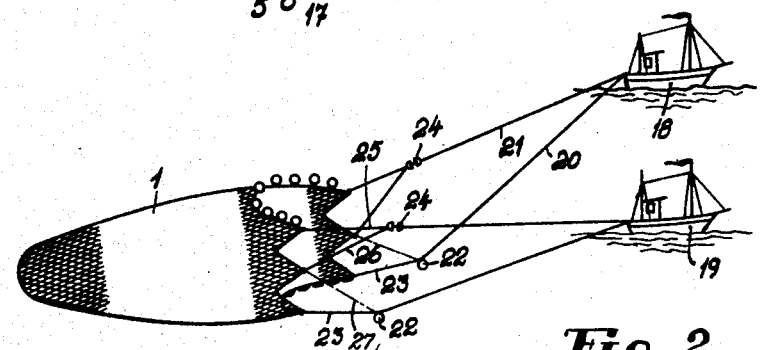
Fig. 2 is a perspective view of a similar trawl adapted to be dragged by two vessels.

The embodiment illustrated in Fig. 2 is similar to that already described only with the exception that it is adapted to be dragged by two vessels, and that the drag ropes extending between the vessels and the mouth of the trawl net are arranged in a different manner. The vessels, being shown at 18 and 19, respectively, are connected with individual ones of the two vertical edges of the mouth of the trawl net by means of two ropes 20 and 21, respectively. The rope 20 extending from the vessel 19 is connected to the lowermost tongue 8 of the relevant vertical edge of the mouth of the net while the rope 21 coming from the same vessel is connected to the uppermost tongue 6 of the same edge. Affixed to the rope 20 at some distance from the tongue 8 is a weight 22 which is adapted to lower the rope 20 in order to facilitate the vertical expansion of the mouth opening of the trawl net. The portion 23 of the rope 20 which extends between the tongue 8 and the weight 22 could be constituted by a separate rope which may be connected to the rope 20 in any suitable manner, preferably through a swivel. In a similar manner, the rope 21 may be divided into two portions interconnected by a swivel 24. Numeral 25 designates the portion of the rope 21 extending between the tongue 6 and the swivel 24. At the point of interconnection of the two rope portions a float could be disposed in order to facilitate the expansion of the mouth opening of the net in a vertical direction. Also connected to the swivel 24 is a further rope 26 which extends to the intermediate tongue 7. The dot-and-dash line 27 indicates the possibility of connecting the tongue 7 with the rope 20 also. As an alternative, the arrangement may be such that the tongue 7 is connectible to the vessel 19 solely by the rope indicated by the dot-and-dash line 27. By varying the relative lengths of the ropes 23, 25, 26 and 27 in a manner similar to that already described in respect of the preceding embodiment, it is readily possible to adjust the width of the trawl mouth vertically.

Figure 3:
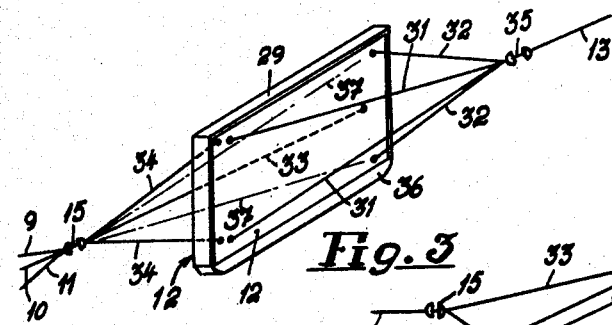
Fig. 3 is a perspective view of a trawl board according to one embodiment of the invention.
Figure 4:
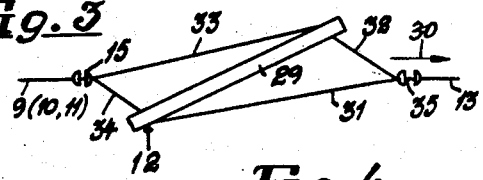
Fig. 4 is a top plan view corresponding to Fig. 3.

Referring now to Figs. 3 and 4, numeral 12 designates the trawl board proper which is connected between a rope 13 and a swivel 15 in the embodiment shown in Fig. 1. The trawl board, in a manner known per se, may be made of wood in which case preferably all the edges thereof may be provided with a lining 29, for instance in the form of flat iron bars. In accordance with the present invention the ropes 9, 10, 11 extending to the trawl net, and the rope 13 extending to the vessel, are connected to the trawl board 12 in such a way, as will be seen from Fig. 4, as to cause the trawl board, when said ropes are being subjected to pull, to adjust itself automatically into a suitably tilted position relative to the direction of the pulling force, the latter direction being indicated by an arrow 30 in Fig. 4. The ropes are connected with the trawl board through connecting elements which, in the example illustrated, consist of chains, the chains connected to the face of the board facing the dragging direction being four in number and so arranged that two chains 31 are secured to the board near its trailing end while two chains 32 are secured near the leading end of the trawl board. Secured to the opposite face of the trawl board are three chains only, one, 33, of these chains being secured near the leading edge of the trawl board while two chains 34 are secured to the board near the trailing edge thereof. The ends of the chains 31, 32 remote from the trawl board are connected to a swivel 35 which, in its turn, is connected to the rope 13. The remaining chains 33, 34 are connected at their ends remote from the trawl board to the swivel 15 to which the ropes 9, 10, 11 are also connected. The chains 31 are greater in length than the chains 32, their length being so dimensioned as to cause the point of interconnection of the chains 31, 32 at the swivel 35 to be disposed near the leading end portion of the trawl board, whereas the length of the chain 33 is greater than the length of the chains 34 by a sufficient amount to cause the point of interconnection of these chains at the swivel 15 to be situated near the trailing end portion of the trawl board, whereby the tilted position of the trawl board, as illustrated in Fig. 4, will be obtained automatically when exerting a pull on the rope 13. Such a tilted position of the trawl board is necessary in order to expand the mouth of the trawl net horizontally. By the ropes 9, 10, 11 and 13, respectively, being connected with the trawl board in this way, it is ensured satisfactorily that the trawl board will adjust itself into the desired position, and also that the trawl board will remain in this position in the course of the trawl being dragged through the water.

Where, as in the instant case, the trawl boards are adapted to be substantially vertically disposed in use, each trawl board is provided at its bottom end with a weight-load 36 which is adapted automatically to adjust the trawl board into a vertical position. The weight-load 36 may be made of iron or any suitable other material the specific gravity of which is materially greater than that of the trawl board proper.

The constructional realization of the invention, of course, is not restricted to the embodiments illustrated and described hereinbefore but may be varied in its details without departing from the scope of the invention. Thus, for instance, the chains 31, 32 and 33, 34 respectively, may be varied in length with a view to enable adjustments of the positions of the points of interconnection of the extreme ends of the chains. It would also be possible, as indicated by dot-and-dash lines in Fig. 3, to employ at the face of the trawl board remote from the drag rope, instead of the chain 33, two chains 37 arranged similarly to the chains 31.

What is claimed is:

1. A trawl comprising a sack-like net body having a mouth end provided with upper, lower and lateral edges, said mouth end being provided with at least six alternate valleys and crests extending about the entire perimeter of the mouth end, with the same being arranged to provide one valley at each of the upper and lower edges whereby three crests are situated along each lateral edge of the mouth end, a rope secured to each of the crests, and means connecting the ropes to a towing vessel.

2. A trawl as claimed in claim 1 in which said means includes two trawl boards serving to expand the mouth end of the body, and means securing the ropes to the trawl boards.

References Cited in the file of this patent

UNITED STATES PATENTS

| 2,671,288 | Larsson | Mar. 9, 1954 |
| 2,771,702 | Breidfjord | Nov. 27, 1956 |

FOREIGN PATENTS

| 13,906 | Sweden | 1902 |
| 271,850 | Switzerland | 1951 |
| 289,581 | Italy | Oct. 21, 1931 |
| 300,514 | Great Britain | Nov. 12, 1928 |
| 316,123 | Great Britain | Aug. 8, 1929 |
| 561,347 | France | 1923 |
| 619,792 | France | 1927 |